(12) United States Patent
Zhang et al.

(10) Patent No.: US 10,681,974 B2
(45) Date of Patent: Jun. 16, 2020

(54) INTERDENTAL TOOTHBRUSH

(71) Applicant: Ranir, LLC, Grand Rapids, MI (US)

(72) Inventors: ZhaoQiang Zhang, Jiangsu (CN); Charles Jones, Warwickshire (GB); Fiona Gale, Surrey (GB); Travis Michael Spoor, Ada, MI (US); Andreas Paul Lanvers, Neunkirchen-Seelscheid (DE)

(73) Assignee: Ranir, LLC, Grand Rapids, MI (US)

( * ) Notice: Subject to any disclaimer, the term of this patent is extended or adjusted under 35 U.S.C. 154(b) by 116 days.

(21) Appl. No.: 15/936,921

(22) Filed: Mar. 27, 2018

(65) Prior Publication Data

US 2018/0279755 A1    Oct. 4, 2018

Related U.S. Application Data

(60) Provisional application No. 62/481,255, filed on Apr. 4, 2017.

(51) Int. Cl.
*A46B 5/02*    (2006.01)
*A46B 9/02*    (2006.01)
(Continued)

(52) U.S. Cl.
CPC .............. *A46B 5/021* (2013.01); *A46B 9/026* (2013.01); *A46B 17/04* (2013.01); *A61C 15/00* (2013.01); *A46B 2200/108* (2013.01)

(58) Field of Classification Search
CPC ... A46B 17/04; A46B 2200/108; A46B 5/021; A46B 9/026; A61C 15/00
See application file for complete search history.

(56) References Cited

U.S. PATENT DOCUMENTS 4,672,706 A * 6/1987 Hill .................... A46B 5/00
                                                15/143.1
D291,505 S    8/1987 Tarrson et al.
(Continued)

FOREIGN PATENT DOCUMENTS

DE    102012015664 A1 *  2/2014
DE    102012015664 A1    2/2014
(Continued)

OTHER PUBLICATIONS

WO2017014302A1—English Machine Translation (Year: 2017).*
(Continued)

*Primary Examiner* — Marc Carlson
(74) *Attorney, Agent, or Firm* — Warner Norcross + Judd LLP (57) ABSTRACT

An interdental brush has a handle with a helix style shape, as well as sections of long and short bristles to maximize plaque removal. The handle has a first end, a second end and a length between the first and second ends. The handle defines a longitudinal axis extending through the handle along the length. A brush extends from the handle and includes a stem projecting along the longitudinal axis and a set of bristles extending laterally outwardly from the stem. Each of the bristles has a bristle length from the stem to a bristle tip, the bristle tips collectively defining a bristle profile. In one embodiment, the bristle profile alternates along the stem between valley sections of short bristle length and mountain sections of long bristle length. The handle includes a grip portion along the length, and the grip portion is shaped such that it is twisted about the longitudinal axis in the manner of a helix.

19 Claims, 7 Drawing Sheets

(51) Int. Cl.
*A46B 17/04* (2006.01)
*A61C 15/00* (2006.01)

(56) References Cited

U.S. PATENT DOCUMENTS

| | | | |
|---|---|---|---|
| 4,828,420 A | 5/1989 | Otsuka et al. | |
| 4,911,187 A * | 3/1990 | Castillo | A46B 7/04 |
| | | | 132/321 |
| 5,309,596 A | 5/1994 | Simms | |
| 5,355,547 A | 10/1994 | Fitjer | |
| 5,363,529 A | 11/1994 | Fitjer | |
| 5,377,377 A | 1/1995 | Bredall | |
| 5,488,751 A | 2/1996 | Gekhter et al. | |
| 5,604,952 A | 2/1997 | Zeleznick | |
| 5,613,258 A | 3/1997 | Hiltinger et al. | |
| 5,699,578 A | 12/1997 | Dumler et al. | |
| 5,853,011 A | 12/1998 | Gueret | |
| 6,325,626 B1 | 12/2001 | Blass | |
| D505,790 S | 6/2005 | Kline | |
| 7,051,740 B2 | 5/2006 | Montoli et al. | |
| 7,069,936 B2 | 7/2006 | Gueret | |
| 7,089,946 B2 | 8/2006 | Rousselet | |
| D536,529 S | 2/2007 | Antler | |
| D575,004 S | 8/2008 | Jansheski et al. | |
| 7,469,702 B2 | 12/2008 | Kim | |
| D614,406 S | 4/2010 | Stieger | |
| 7,694,378 B2 | 4/2010 | Tsurukawa et al. | |
| 7,698,772 B1 | 4/2010 | Hauser, Jr. | |
| 8,001,980 B2 | 8/2011 | Lhoyer et al. | |
| 8,042,554 B2 | 10/2011 | Dumler | |
| 8,079,373 B2 | 12/2011 | Wyatt et al. | |
| 8,146,284 B2 | 4/2012 | Smith | |
| 8,151,807 B2 | 4/2012 | Holloway et al. | |
| 8,256,848 B2 | 9/2012 | Lee | |
| D674,610 S | 1/2013 | Eatherton | |
| 8,448,650 B2 | 5/2013 | Higgins | |
| 8,469,041 B2 | 6/2013 | Pires et al. | |
| 8,528,147 B2 | 9/2013 | Larsson et al. | |
| 8,567,000 B2 | 10/2013 | Kubo | |
| 8,636,013 B2 | 1/2014 | Vandromme | |
| 8,757,912 B2 | 6/2014 | Jimenez et al. | |
| 8,826,923 B2 | 9/2014 | Caulier | |
| 8,850,650 B2 | 10/2014 | Borsari et al. | |
| 8,915,551 B2 | 12/2014 | Rees et al. | |
| 8,918,944 B2 | 12/2014 | Kato et al. | |
| D744,756 S | 12/2015 | Kato et al. | |
| 9,265,333 B2 | 2/2016 | Huang | |
| D757,440 S | 5/2016 | Butz | |
| D763,578 S | 8/2016 | Kato et al. | |
| D764,103 S | 8/2016 | Wallstrom et al. | |
| D764,104 S | 8/2016 | Wallstrom et al. | |
| D765,988 S | 9/2016 | Kato et al. | |
| D767,900 S | 10/2016 | Kalbfeld | |
| 2007/0102313 A1 * | 5/2007 | Kuo | A61C 15/00 |
| | | | 206/369 |
| 2011/0072603 A1 | 3/2011 | Vu et al. | |
| 2015/0000699 A1 * | 1/2015 | Kelsey | A61C 19/063 |
| | | | 134/6 |
| 2015/0282601 A1 * | 10/2015 | Butz | A46B 1/00 |
| | | | 15/167.1 |
| 2015/0335141 A1 * | 11/2015 | Schar | A46B 1/00 |
| | | | 15/106 |
| 2018/0235358 A1 * | 8/2018 | Rees | A46D 1/0253 |

FOREIGN PATENT DOCUMENTS

| | | | | |
|---|---|---|---|---|
| EP | 0680707 A2 | | 11/1995 | |
| EP | 3219290 A1 | | 9/2017 | |
| EP | 3469948 A1 * | | 4/2019 | A46B 3/005 |
| GB | 2361632 A * | | 10/2001 | A46B 3/18 |
| GB | 2361632 B | | 5/2004 | |
| JP | 2016193084 A | | 11/2016 | |
| WO | 2016076373 A1 | | 5/2016 | |
| WO | WO-2016076373 A1 * | | 5/2016 | A61C 15/02 |
| WO | WO-2016199833 A1 * | | 12/2016 | B29C 45/14065 |
| WO | 2017014302 A1 | | 1/2017 | |
| WO | WO-2017014302 A1 * | | 1/2017 | A46B 5/00 |
| WO | WO-2017122783 A1 * | | 7/2017 | A46B 3/04 |

OTHER PUBLICATIONS

Canadian Office Action, dated Mar. 21, 2019, for CA patent application 2,999,631, a foreign counterpart to U.S. Appl. No. 15/936,921.
European Search Report, completed on Aug. 21, 2018, for EP patent application EP 18 16 5584, a foreign counterpart to U.S. Appl. No. 15/936,921.

* cited by examiner

INTERDENTAL TOOTHBRUSH

BACKGROUND

The present invention relates to interdental brushes, which are well known in the dental industry. Interdental brushes fit into spaces between and around the teeth. A variety of interdental brush styles are available, including small, portable devices that fit easily into pockets or purses and are generally disposable, as well as larger, reusable style handles that may receive replaceable brush portions. Each of these styles presents advantages and disadvantages. For example, the smaller, disposable style interdental brushes often include a one piece molded plastic handle and neck that is relatively flimsy and difficult to grip, with a simple brush portion extending from one end. The benefits of being easily stored and disposed are balanced by discomfort and difficulty in manipulation. On the other hand, while the larger handle style may be more comfortable and easier to manipulate, it is bulky and difficult to transport.

SUMMARY OF THE INVENTION

The interdental brush of the present invention provides a handle with a 'helix style shape' with long and short bristles to maximize plaque removal.

In one embodiment, the present invention provides an interdental brush having a handle with a first end, a second end and a length between the first and second ends. The handle defines a longitudinal axis extending through the handle along the length. A brush extends from the handle and includes a stem projecting along the longitudinal axis and a set of bristles extending laterally outwardly from the stem. Each of the bristles has a bristle length from the stem to a bristle tip, the bristle tips collectively defining a bristle profile. In one embodiment, the bristle profile alternates along the stem between valley sections of short bristle length and mountain sections of long bristle length. The handle includes a grip portion along the length, and the grip portion is shaped such that it is twisted about the longitudinal axis in the manner of a helix.

The bristles and the bristle profile may be arranged to provide comfort and effective plaque removal. In one embodiment, the bristles within the valley sections have a first bristle diameter and the bristles within the mountain sections have a second diameter different from the first diameter. The first diameter may be less than said second diameter such that said bristles within said valley sections have a greater degree of flexibility than said bristles within said mountain sections and feel softer to the user than the mountain sections. Alternatively, the first diameter may be greater than the second diameter such that the bristles within the valley sections have a lesser degree of flexibility than said bristles within said mountain sections.

The bristles and the bristle profile may also be arranged for ease of insertion and removal from between a user's teeth. In one embodiment, one of the valley sections is proximate said handle and one of said valley sections is disposed at a distal end of said stem. In another embodiment, the bristles in the valley sections have a different color than said bristles in said mountain sections for visual recognition of the varied bristle types.

In another embodiment, the grip portion of the handle is non-cylindrical with opposing grip surfaces for user comfort and manipulation. The first end and the second end of the handle may be generally cylindrical, with the handle having first and second opposing side surfaces between the first and second ends. The distance between the first and second side surfaces may increase approaching said first and second ends.

The interdental brush provides advantages in both comfort/manipulation and in effective cleaning. The bristles may be formed from a variety of filament types, including—natural antibacterial, Staclean™, and bristles with encapsulated flavor. The twisted handle allows the user to turn the brush in different directions. The bristles may have a range of different sizes for different sized gaps between the teeth of a user. The different colored filaments, such as darker filaments, show plaque removal and also show a differentiation between filament types.

These and other advantages and features of the invention will be more fully understood and appreciated by reference to the description of the current embodiments and the drawings.

DETAILED DESCRIPTION OF THE CURRENT EMBODIMENT

The present invention is directed to an interdental brush 10 that includes a handle portion 12 and a brush 14 extending from the handle 12. The brush includes a stem 16, which may be formed from a twisted wire, holding a plurality of bristles (or "filaments") 18. The components of the interdental brush 10 are described in more detail below.

A. Brush

The brush 14 includes the stem 16, generally formed by a wire, and the filaments 18 supported by the wire 16. The stem 16 extends from the handle 12 as described in more detail below. In one embodiment, the wire is stainless steel with blue polyurethane coating. More particularly, the wire may be: stainless steel, AISI 304, coated with polyurethane. In the illustrated embodiment, the wire has a diameter of 0.5 mm and the coating has a diameter of 0.25 mm. The diameters may be changed, for example, for a kids' application. In general, the wire 16 is folded into a U-shape with the filaments 18 inserted between the two portions of wire 16. The wire 16 is twisted to retain the filaments 18 as shown in FIGS. 9 and 14-18. The twisted wire retains the bristles 18 in a helical pattern. Alternative methods for attaching the bristles to the wire may otherwise be used.

Figure 1:
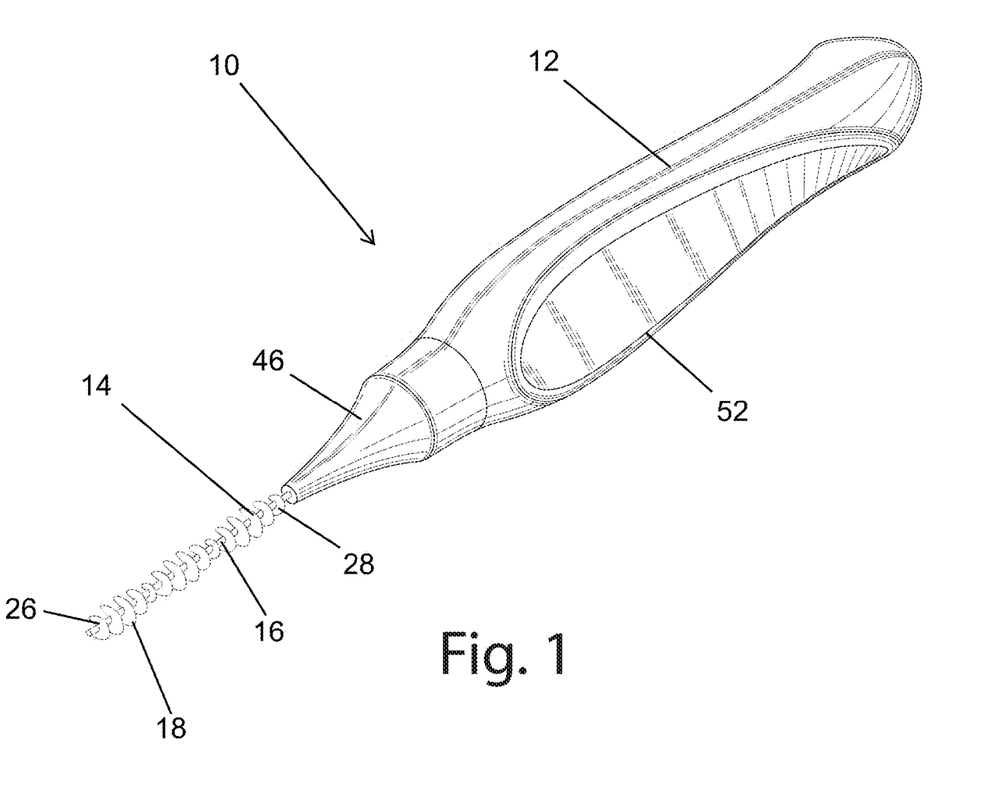
FIG. 1 is a perspective view of an interdental brush according to one embodiment.
Figure 2:
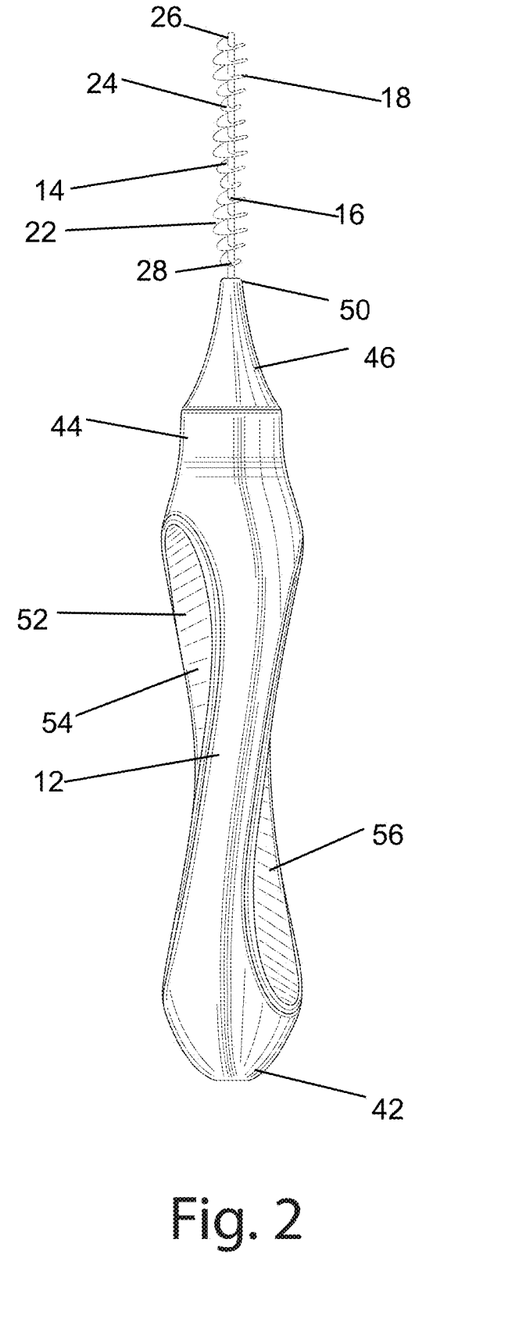
FIG. 2 is a right side view, the left side view being a mirror image thereof.
Figure 3:
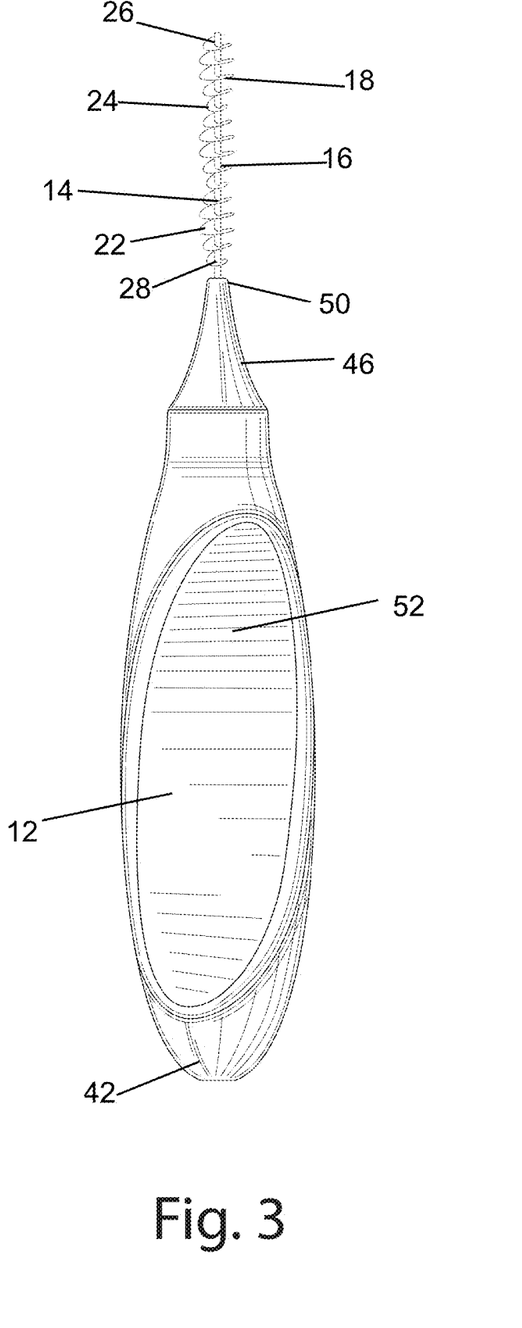
FIG. 3 is a front view thereof.
Figure 4:
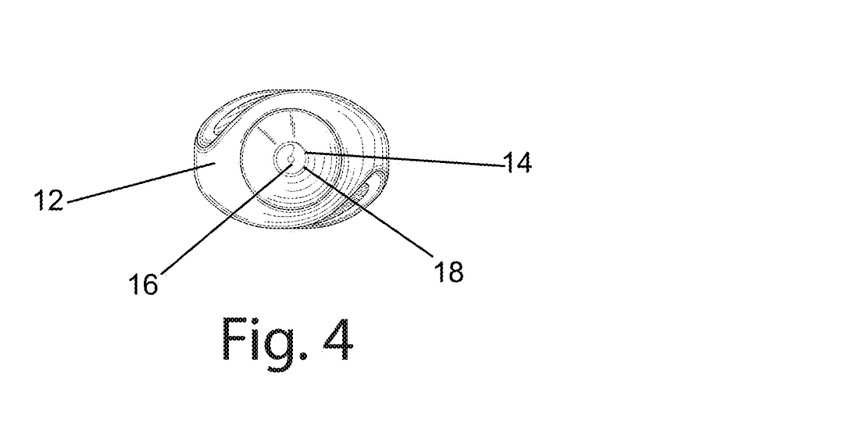
FIG. 4 is a top view thereof.
Figure 5:
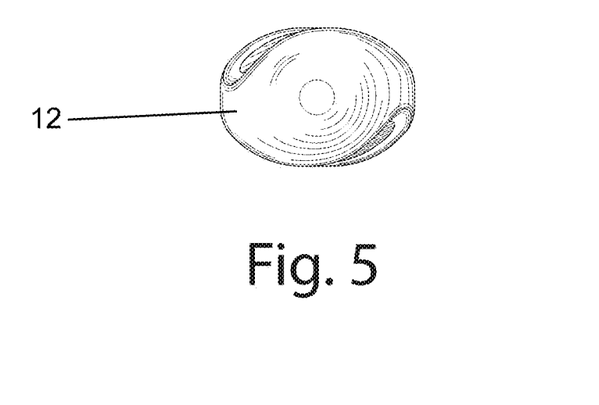
FIG. 5 is a bottom view thereof.
Figure 6:
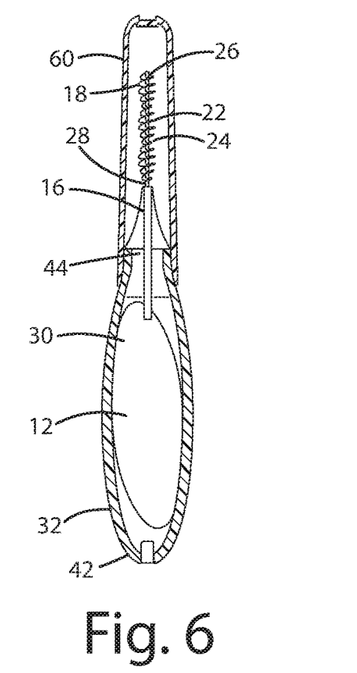
FIG. 6 is a side cross sectional view taken along line B-B in FIG. 7.
Figure 7:
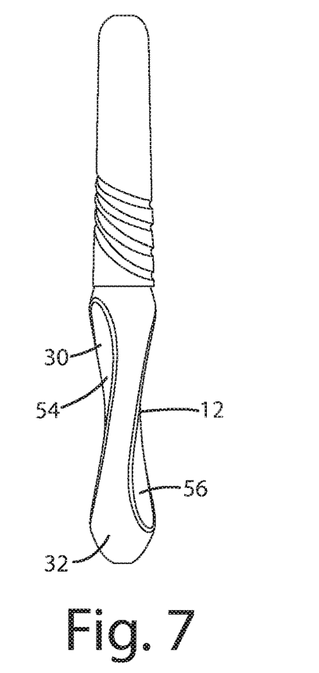
FIG. 7 is a side view of the interdental brush also including a removable cap.
Figure 8:
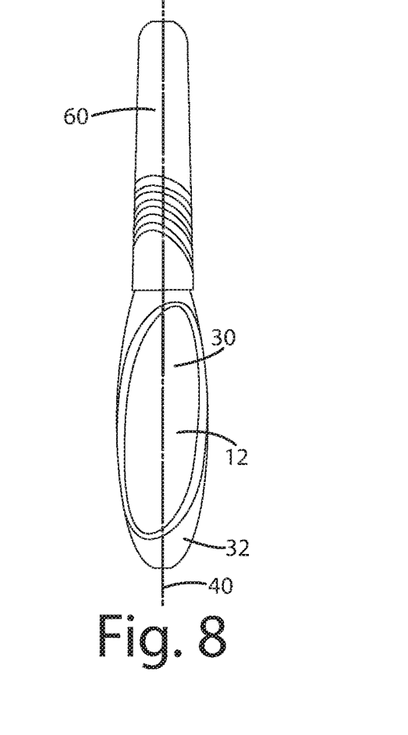
FIG. 8 is a front view thereof.
Figure 9:
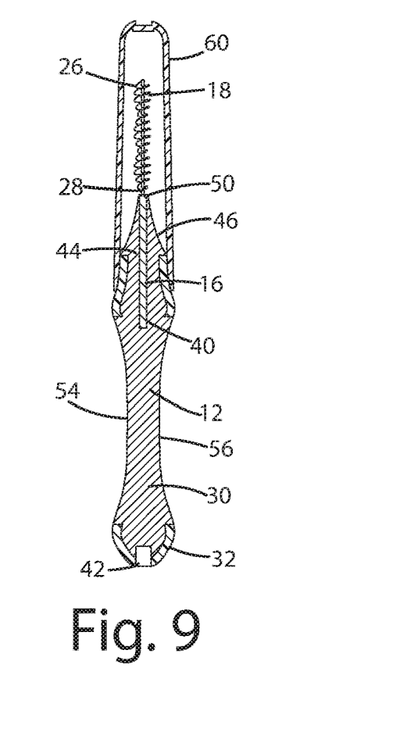
FIG. 9 is a side cross sectional view taken along line A-A in FIG. 8.
Figure 10:
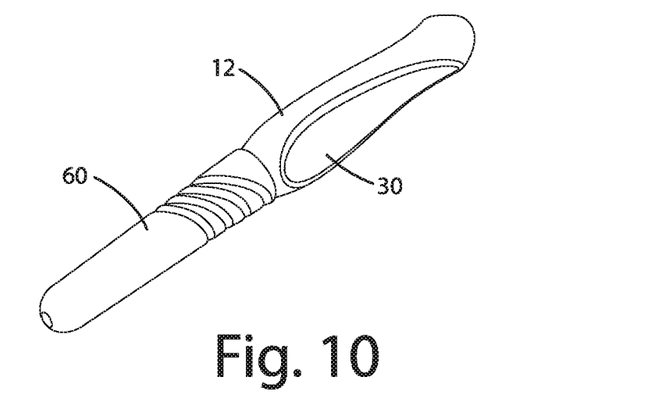
FIG. 10 is a perspective view of the interdental brush with cap.
Figure 11:
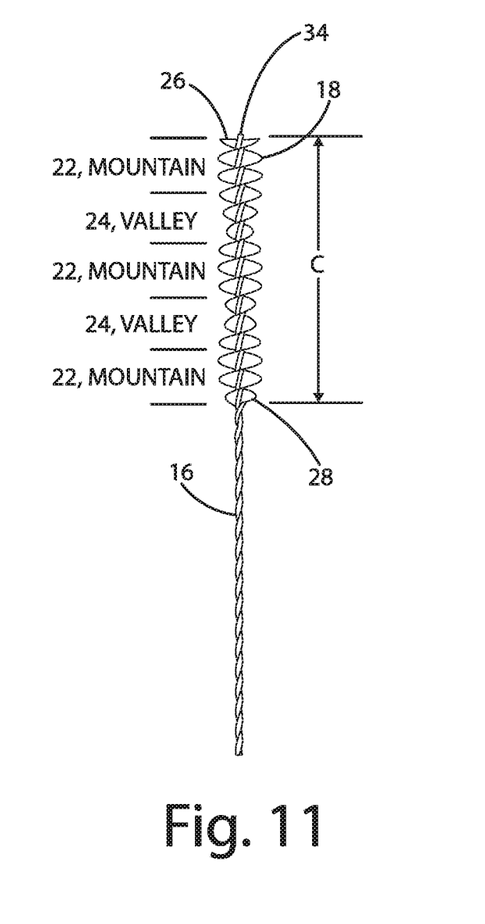
FIG. 11 is a side view of one embodiment of a wire and bristle portion of the interdental brush.

Referring to FIG. 11, the bristles 18 are arranged along a portion of the length of the stem 16 to form a brush length C. The bristles 18 extend from a distal end 26 of the brush length to a proximal end 28 of the brush length that is proximate the handle 12. In the illustrated embodiment of FIGS. 1-10, the distal end 26 of the brush length is approximately aligned with the distal end 34 of the stem 16 for comfort in insertion of the brush 14 between the user's teeth, although in another embodiment, such as that shown in FIGS. 12 and 13, they may be offset, for example, by about 0.6 mm.

Figure 12:
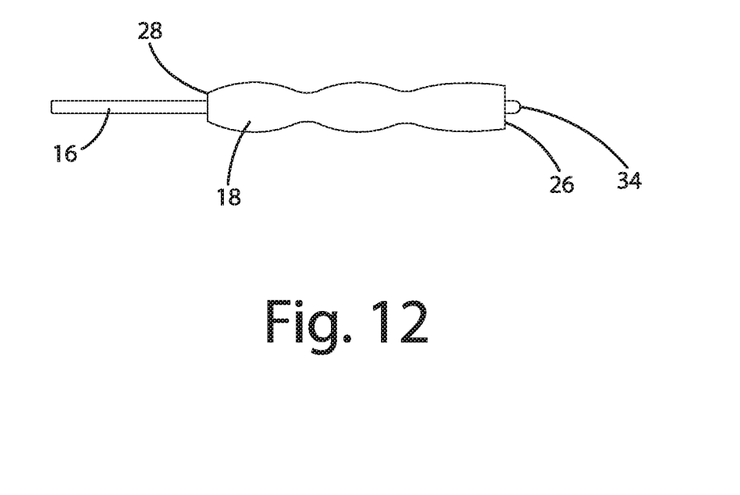
FIG. 12 is a side view of one embodiment of a bristle profile.
Figure 13:
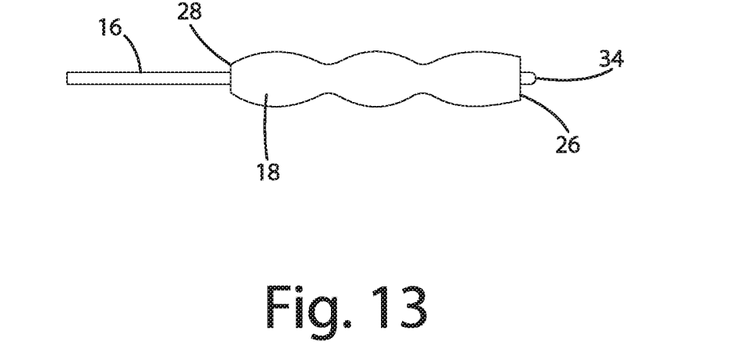
FIG. 13 is a side view of another embodiment of a bristle profile.

In one embodiment, the bristles are arranged and trimmed for effective plaque removal. Referring particularly to FIGS. 11-13 wherein the bristles 18 are illustrated diagrammatically, in one embodiment the bristles each have a bristle length defined as the length between the stem 16 and the bristle tip 20 (even though the bristle filaments extending through the twisted wire may actually be twice as long from tip to tip as the defined bristle length). The bristle lengths can be trimmed to collectively form a bristle profile. The bristles 18 may be trimmed by a variety of conventional cutting methods. As shown in FIG. 11, one such bristle profile includes a series of "mountain" sections 22 alternating with a series of "valley" sections 24. In this case, the mountain sections 22 are generally trimmed to have bristle filaments 18 of longer lengths and the valley sections 24 are generally trimmed to have shorter lengths. FIGS. 12 and 13 illustrate two possible embodiments for the bristle profile. FIG. 12 illustrates a potential bristle profile for a smaller sized interdental brush 12 while FIG. 13 illustrates a potential bristle profile for a larger sized interdental brush.

As shown in FIG. 12, in this embodiment, the mountain sections 22 have 2.1 mm bristles from tip to tip (defining a bristle length from stem 16 to bristle tip 20 of 1.05 mm). The valley sections 24 have 1.2 mm bristles from tip to tip (defining a bristle length of 0.6 mm). In this case, the mountain bristles have a bristle length that is 75% greater than the valley bristle length. In the FIG. 13 embodiment, the mountain bristles are 2.4 mm from tip to tip for a bristle length from stem to tip of 1.2 mm. The valley bristles once again have 1.2 mm bristles from tip to tip (defining a bristle length of 0.6 mm). The mountain bristles of this embodiment therefore have a bristle length that is 100% greater than the bristle length of the valley bristles. As shown in both embodiments, the bristle profile may be trimmed with a radius between each of the mountain 22 and valley 24 sections for a smooth transition between each section. The bristle filament length can be changed on request, but the outer profile is controlled and limited by trimmer itself. In other words, the filaments are trimmed by a trimmer to final lengths and a final profile.

The FIG. 12 and FIG. 13 embodiments also show an example of the longitudinal lengths of the mountain 22 and valley 24 bristle sections. As shown in FIGS. 12 and 13, the brush length is about 12.5 mm, each of the three mountain sections 22 has a longitudinal length of about 3 mm, and each of the two valley sections 24 has a longitudinal length of about 1.75 mm. In other words, the mountain sections comprise about 70% of the brush length and the valley sections comprise about 30% of the brush length. In another embodiment, the mountain sections 22 comprise about 60% of the brush length and the valley sections 24 about 40% of the brush length. The valley sections, having shorter bristles, are easier to slide between the users teeth; therefore, adjusting the respective height and length of the mountain 22 and valley sections 24 will control the ease of insertion and comfort of use of the interdental brush.

In one embodiment, the bristles 18 in the mountain sections 22 may be a different bristle type than the bristles 18 in the valley sections 24 for a desired cleaning effect. For example, the bristles 18 in the valley sections 24 may have a different diameter than the bristles 18 in the mountain sections 22. The mountain section bristles may also have a different color than the valley section bristles, which can provide multiple advantages. For instance, darker bristles can assist in identifying plaque that has been removed from the user's mouth. A variation in bristle color can also indicate variations in the bristle type. In one embodiment, the bristles 18 in the longer mountain sections 22 have a smaller diameter than the bristles 18 in the shorter valley sections 24. In such an embodiment, the bristles 18 in the valley sections 24 are more rigid and less flexible for greater abrasion and plaque removal. In one example, the brush 12 includes blue 2 mils filaments (1 mil(s)=0.0001 in) on the longer "mountain area," and white 2.5 mils filaments are used on the narrower "valley areas," this can also be changed if needed. In another embodiment, the bristles 18 in the valley sections 24 may have a smaller diameter than the bristles 18 in the mountain sections 22, providing less rigidity and more flexibility in the valley areas for an application of increased comfort and ease of insertion. Other examples of bristle color and bristle diameter variation are identified in Table A, below, and illustrated in FIGS. 14-18.

TABLE A

Figure 14:
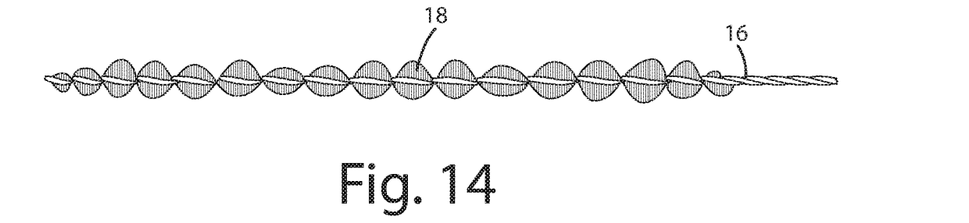
FIG. 14 is a side view of an embodiment of a wire and bristle portion of the interdental brush.
Figure 15:
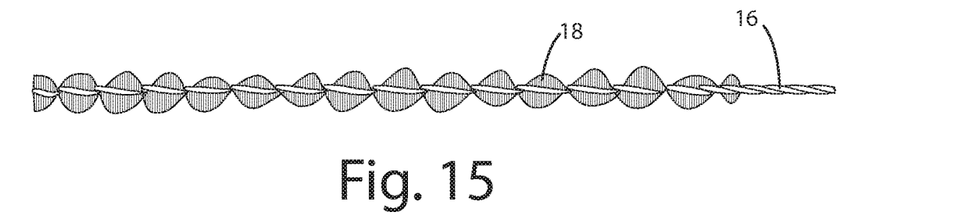
FIG. 15 is a side view of another embodiment of a wire and bristle portion of the interdental brush.
Figure 16:
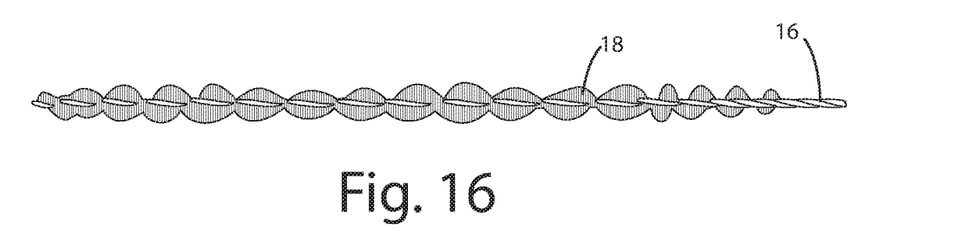
FIG. 16 is a side view of another embodiment of a wire and bristle portion of the interdental brush.
Figure 17:
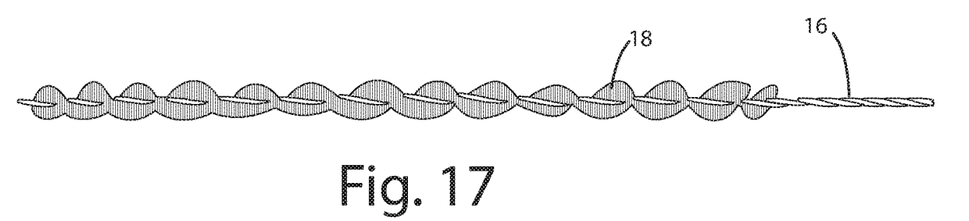
FIG. 17 is a side view of another embodiment of a wire and bristle portion of the interdental brush.
Figure 18:
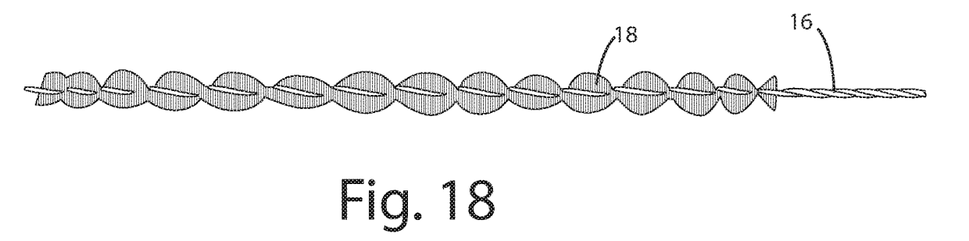
FIG. 18 is a side view of another embodiment of a wire and bristle portion of the interdental brush.

| Trim Identifier | Mountains (Diameter) | Valleys (Diameter) | FIG. (Brush Photo) | Standard Interdental Brush Size |
| --- | --- | --- | --- | --- |
| Trim A-1 | 2 Mils White | 2.5 Mils White | FIG. 14 | ISO1 |
| Trim A-2 | 2.5 Mils White | 2 Mils White | FIG. 15 | ISO2 |
| Trim A-3 | 2 Mils White | 3 Mils Blue | FIG. 16 | ISO1 |
| Trim A-4 | 3 Mils Blue | 2 Mils White | FIG. 17 | ISO2 |
| Trim A-5 | 3 Mils Blue | 3 Mils Blue | FIG. 18 | ISO3 |

In another embodiment, the bristle filaments 18 may be formed from one or more bristle materials, each of which may provide effective cleaning and comfort. Filament materials for one embodiment of the present invention are described below (and are representative of the brush shown in FIG. 16): The standard material is Polyamide PA 6.12, having a diameter of 2 mils for the illustrated blue bristles, which comprise 60% of the brush length. An alternate/equivalent material is found from manufacturer DUPONT®. The standard material is Polyamide PA 6.12, having a diameter of 2.5 mils for the illustrated white bristles, which comprise 40% of the brush length. An alternate/equivalent material is found from manufacturer DUPONT®. Another alternate material is Polyamide PA 6.12, having a diameter of 3.0 mils.

Other bristle types may be used, depending on the application, such as natural antibacterial bristles, Staclean™, and bristles with encapsulated flavor.

B. Handle

The handle 12 is generally formed from molded plastic. In the illustrated embodiment, the handle 12 is formed from a skeleton 30 that is overmolded with an overmold material 32. Referring to FIGS. 1-10, for convenience, comfort and aiding the user in manipulating the brush between the teeth of the user, the handle 12 may be formed with a "helix" shape, such that the handle 12 has a gradual twist about a longitudinal axis 40.

More particularly, the handle 12 includes a first end 42, a second end 44 and a neck 46 extending from the second end 44. In the illustrated embodiment, the first end 42 and the second end 44 are generally cylindrical, with the first end 42 tapering to a rounded tip 48 and the second end 44 tapering to the neck 46. The neck 46 is generally conical, tapering to a narrow distal end 50. The handle 12 defines a longitudinal axis 40, and the stem 16 is inserted into the neck 46 and extends through a portion of the handle 12 along the longitudinal axis 40. The stem 16 may be embedded in the handle 12 in a variety of methods, such as being placed into a mold and molding the handle about the stem 16.

As illustrated, the handle further includes a grip portion 52 between the first 42 and second 44 ends. The grip portion 52 may be non-cylindrical and may include opposing side surfaces 54, 56 for being gripped between the thumb and fingers of a user. In the illustrated embodiment, the side surfaces 54, 56 are generally oval shaped although other shapes may be used. The handle 12 includes a handle width defined between the side surfaces 54, 56, and as shown the side surfaces 54, 56 are formed into the handle 12 such that the handle width between the side surfaces 54, 56 increases approaching the first 42 and second 44 ends of the handle 12.

As noted, the handle 12 is generally formed from one or more molded plastics. In one embodiment, the skeleton 30 material may be polypropylene (PP)+thermoplastic elastomer (TPE) or linear low-density polyethylene (LLDPE)+TPE. The overmold material 32 may be TPE, and may be colored, such as green, orange or blue. In the illustrated embodiment, the overmold material 32 is softer than the skeleton 30, and the overmold 32 is positioned to overlap the entire handle 12 except for the opposing side surfaces 54, 56 of the grip portion 52, which are formed from the exposed skeleton 30. In another embodiment, the overmold 32 may cover at least a portion of the side surfaces 54, 56. In one embodiment, the handle is formed using an insert molding method, although other molding methods may be used. Material information according to one embodiment of the skeleton and overmold are set forth below:

| Skeleton Material | | weight |
| --- | --- | --- |
| (Standard) PP HE125MO | | |
| Homo polymer Or PP RE420MO | | |
| Random PP co-polymer | 97% | 0.8 g (TBD) |
| (Alternate) LLDPE M500026 | 97% | 0.8 g |
| Batch White | | 3% |
| Youngs modulus/Tensile Modulus | | 10 MPa |
| Overmold Material | | |
| TPE TF 7 | | 97% 0.54 g |
| Batch color | | 3% |
| Hardness. 70 Shore | | |
| Dimensions length/width (mm): | | |
| Total weight: 1.34 g | | |

Referring again to FIGS. 1-10, the handle 12 is provided with a twisted shape for user comfort and ease of manipulation by rotating the handle 12 between the thumb and fingers. The handle 12 is twisted about the longitudinal axis 40 in the manner of a helix, wherein a tangent line at any point makes a constant angle with the longitudinal axis 40. As a result of the twist, the handle width between the opposing side surfaces 54, 56 within the grip portion 52 remains constant as the handle 12 twists about the longitudinal axis 40. In the illustrated embodiment, the handle 12 is twisted approximately 47.5 degrees between the first end 42 and the second end 44. This amount of twist has been tested to provide a comfortable level of manipulation for a user. Other amounts of twist may otherwise be provided for different sizes and for specific user types.

C. Cap

In one embodiment, shown in FIGS. 6-10, the interdental brush includes a cap 60 that can extend over the brush and fits onto the handle in a snap fit or friction fit. The cap may be transparent PP and sized just to fit over the neck 46 and onto the second end 44 of the helix handle 12. Materials for the cap according to one embodiment of the invention are set forth below:

Standard:
5/Blister
7/Blister
Transparent PP RE420MO Random PP co-polymer
Weight: 0.8 g (TBD)

In the illustrated embodiment, the cap 60 is generally cylindrical; however other shapes may be used to match or fit the shape of the handle 12.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An interdental brush comprising:
a handle having a first end, a second end and a length between said first and second ends, said handle defining a longitudinal axis extending through said handle along said length;
a neck extending from said second end;
a brush extending from said neck, the brush including a stem projecting from said neck along said longitudinal axis and a set of bristles extending laterally outwardly from said stem, each of said bristles having a bristle length from said stem to a bristle tip, said bristle tips collectively defining a bristle profile, said bristle profile alternating along said stem between valley sections of short bristle length and mountain sections of long bristle length;
wherein said handle includes a non-cylindrical grip portion along said length, said grip portion shaped such that it is twisted about said longitudinal axis in the manner of a helix, said grip portion comprising opposing first and second grip surfaces for being gripped between the thumb and fingers of a user;

wherein said first end and said second end of said handle are cylindrical, said non-cylindrical grip portion being disposed between said cylindrical first and second ends;

wherein said opposing first and second grip surfaces are elongated along said longitudinal axis;

wherein, in a first cross-section taken along the longitudinal axis, the handle includes a first handle width defined between the opposing first and second grip surfaces, and the first handle width increases approaching said first end and said second end of said handle; and wherein said opposing first and second grip surfaces comprise curved first grip ends which curve outwardly from the longitudinal axis to meet the cylindrical first end of the handle, and wherein said opposing first and second grip surfaces comprise curved second grip ends which curve outwardly from the longitudinal axis to meet the cylindrical second end of the handle.

2. The interdental brush of claim 1 wherein said bristles within said valley sections have a first bristle diameter and said bristles within said mountain sections have a second diameter different from said first diameter.

3. The interdental brush of claim 2 wherein said first diameter is less than said second diameter such that said bristles within said valley sections have a greater degree of flexibility than said bristles within said mountain sections.

4. The interdental brush of claim 2 wherein said first diameter is greater than said second diameter such that said bristles within said valley sections have a lesser degree of flexibility than said bristles within said mountain sections.

5. The interdental brush of claim 4 wherein one of said valley sections is proximate said handle.

6. The interdental brush of claim 5 wherein one of said valley sections is disposed at a distal end of said stem.

7. The interdental brush of claim 6 wherein said bristles in said valley sections have a different color than said bristles in said mountain sections.

8. The interdental brush of claim 1 wherein said grip portion comprises opposing first and second side surfaces intermediate the opposing first and second grip surfaces.

9. The interdental brush of claim 8 wherein, in a second cross-section taken along the longitudinal axis orthogonal to the first cross-section, the handle includes a second handle width defined between the opposing first and second side surfaces, and the second handle width decreases approaching said first end and said second end of said handle.

10. An interdental brush, comprising:
a handle having a first end and a second end opposite said first end, said handle defining a longitudinal axis and a length between the first end and the second end and extending along said longitudinal axis; and
a brush extending from said handle, said brush including a stem and bristles extending from said stem, said stem extending from said second end of said handle along said longitudinal axis, said bristles extending laterally outwardly from said stem;
wherein said handle includes a non-cylindrical grip portion along said length, said grip portion shaped such that it is twisted about said longitudinal axis in the manner of a helix, said grip portion comprising opposing first and second grip surfaces for being gripped between the thumb and fingers of a user;
wherein said first end and said second end of said handle are cylindrical, said non-cylindrical grip portion being disposed between said cylindrical first and second ends;
wherein said opposing first and second grip surfaces are elongated along said longitudinal axis;

wherein in a first cross-section taken along the longitudinal axis, the handle includes a first handle width defined between the opposing first and second grip surfaces, and the first handle width increases approaching said first end and said second end of said handle; and wherein said opposing first and second grip surfaces comprise curved first grip ends which curve outwardly from the longitudinal axis to meet the cylindrical first end of the handle, and wherein said opposing first and second grip surfaces comprise curved second grip ends which curve outwardly from the longitudinal axis to meet the cylindrical second end of the handle.

11. The interdental brush of claim 10 wherein each of said bristles has a bristle length from said stem to a bristle tip, said bristle tips collectively defining a bristle profile, said bristle profile alternating along said stem between valley sections of short bristle length and mountain sections of long bristle length.

12. The interdental brush of claim 11 wherein said bristles within said valley sections have a degree of flexibility that is different from the degree of flexibility of said bristles within said mountain sections.

13. The interdental brush of claim 11 wherein said bristle length of said bristles within said mountain sections is at least 75% longer than said bristle length of said bristles within said valley sections.

14. The interdental brush of claim 13 wherein said bristle length of said bristles within said mountain sections is about 100% longer than said bristle length of said bristles within said valley sections.

15. The interdental brush of claim 11 wherein said bristles define a brush length along said stem and wherein said mountain sections comprise at least about 50% of said brush length.

16. The interdental brush of claim 15 wherein said mountain sections comprise at least about 60% of said brush length.

17. The interdental brush of claim 16 wherein said bristles in said mountain sections have a different color than the bristles in said valley sections.

18. The interdental brush of claim 17 wherein said handle has at least 47.5 degrees of twist between said first end and said second end.

19. An interdental brush comprising:
a handle having a first end, a second end and a length between said first and second ends, said handle defining a longitudinal axis extending through said handle along said length, said handle including a base formed from a first material and a grip material extending over a portion of said base and formed from a second material softer than said first material;
a brush extending from said handle, the brush including a stem projecting from said second end of said handle along said longitudinal axis and a set of bristles extending laterally outwardly from said stem, each of said bristles having a bristle length from said stem to a bristle tip, said bristle tips collectively defining a bristle profile, said bristle profile alternating along said stem between valley sections of short bristle length and mountain sections of long bristle length, wherein said bristle length in said mountain sections is at least about 75% greater than the bristle length in said valley sections;
wherein said handle includes a grip portion along said length, said grip portion shaped such that it is twisted about said longitudinal axis in the manner of a helix, wherein said grip portion is non-cylindrical and comprises opposing first and second grip surfaces for being gripped between the thumb and fingers of a user;

wherein said first end and said second end of said handle are cylindrical, said non-cylindrical grip portion being disposed between said cylindrical first and second ends;

wherein said opposing first and second grip surfaces are elongated along said longitudinal axis;

wherein in a first cross-section taken along the longitudinal axis, the handle includes a first handle width defined between the opposing first and second grip surfaces, and the first handle width increases approaching said first end and said second end of said handle; and wherein said opposing first and second grip surfaces comprise curved first grip ends which curve outwardly from the longitudinal axis to meet the cylindrical first end of the handle, and wherein said opposing first and second grip surfaces comprise curved second grip ends which curve outwardly from the longitudinal axis to meet the cylindrical second end of the handle.

* * * * *